United States Patent [19]

Rosenberger

[11] 4,168,881
[45] Sep. 25, 1979

[54] ANTI-VIBRATION MICROSCOPE STAND

[75] Inventor: Harold E. Rosenberger, Rochester, N.Y.

[73] Assignee: Bausch & Lomb Incorporated, Rochester, N.Y.

[21] Appl. No.: 858,594

[22] Filed: Dec. 8, 1977

Related U.S. Application Data

[63] Continuation of Ser. No. 623,535, Oct. 17, 1975, abandoned, and a continuation of Ser. No. 330,797, Feb. 1, 1973, abandoned, and a continuation of Ser. No. 134,565, Apr. 16, 1971, abandoned.

[51] Int. Cl.$^2$ .............................................. G02B 21/00
[52] U.S. Cl. ........................................ 350/82; 350/86
[58] Field of Search ........................ 350/82, 84, 86, 87

[56] References Cited

U.S. PATENT DOCUMENTS

| | | | |
|---|---|---|---|
| 1,649,068 | 11/1927 | Kohler | 350/46 |
| 2,170,967 | 8/1939 | Eppenstein et al. | 350/39 |
| 3,019,707 | 2/1962 | Straat | 350/86 |
| 3,260,157 | 7/1966 | Boughton | 350/84 |
| 3,565,512 | 2/1971 | Peck | 350/252 |

*Primary Examiner*—John K. Corbin
*Assistant Examiner*—Matthew W. Koren
*Attorney, Agent, or Firm*—Frank C. Parker; DeWitt M. Morgan

[57] ABSTRACT

In a microscope the eyepiece and the objective lenses are separately mounted, the objective being mounted in a cantilever member which is rigidly attached to a rigid portion of a support pillar. The eyepiece is also cantilevered out from the support pillar, the eyepiece cantilever being spaced away from the objective-mounting cantilever and entirely free of contact therewith, except only the remote contact through the pillar. To maintain the most rigid possible relationship between objective and stage, the stage is focusably mounted on a rigid portion of the same support pillar. With the stage-to-objective distance, or object conjugate, held firm and relatively free of vibrations the distance to the eyepiece focal plane, or image conjugate, is much less critical; therefore the eyepiece support member, while also relatively rigid, is less so than the pillar and it tends to absorb vibrations emanating from the eyepiece area and to isolate both the stage and objective mounting members from the eyepiece mounting members, thereby reducing the degree to which such vibrations can affect the critical object conjugate. The effect of vibration may be minimized even more by letting the objective furnish an infinite focus, the image being viewed by a telescopic eyepiece.

4 Claims, 3 Drawing Figures

ANTI-VIBRATION MICROSCOPE STAND

CROSS-REFERENCES TO RELATED APPLICATIONS

This application is a continuation of application Ser. Nos. 623,535, (filed Oct. 17, 1975), 330,797 (filed Feb. 1, 1973) and 134,565 (filed Apr. 16, 1971), all now abandoned.

BACKGROUND OF THE INVENTION

1. Field of the Invention

This invention lies in the field of anti-vibration microscope stands.

2. Description of the Prior Art

Vibration is a great inhibitor of microscope performance and it becomes a greater problem as the expected magnification and desired image quality increase, being particularly sensitive in the field of photomicrography. At the threshold of the problem are vibrations which derive from the environment, such as footsteps, power applications, vehicles and other movements in the vicinity. It is assumed that suitable isolation means has been provided to reduce the effect of such vibrations on the microscope base. There remain, nonetheless, inherent vibrations, i.e., those deriving from the microscope itself, or which derive from its operation, as for instance from movement of the shutter of a photomicrographic camera, from other dynamics of microscope accessories, or simply from an operator's resting his hand on the microscope superstructure. The problem is compounded by the need for modular, building-block approaches to microscope design, wherein a variety of modules may be substituted for, or combined with, one another in putting a microscope together, since the additional modules add mass to the superstructure, which enhances the vibrations.

Previous attempts to deal with vibration problems in microscopes have mostly centered around the isolation of the microscope from its environment, for example, by shock mountings or fluid suspensions, as with an air-bearing. Specific to the question of inherent vibrations, the only known art suggests that the solution lies in maintaining a rigid eyepiece-to-stage conjugate (See for example U.S. Pat. No. 3,260,157) while leaving the objectives free to move for focusing.

SUMMARY OF THE INVENTION

The present invention proceeds upon the assumption that the most critical relationship in a microscope, as concerns inherent vibrations, is the relative positioning of the objective lens and the specimen plane. As may be seen in FIG. 1, which is a schematic diagram of a microscope optical system comprising an objective O and an eyepiece lens ep, this is because variations $\Delta s$ in the object conjugate (the distance s from objective to specimen plane) become variations $\Delta i$ in the image conjugate (the distance i from objective to its focal plane) according to the relationship $$\Delta i = m^2 \Delta s,$$

where m is the magnification of the objective. Thus, it may be seen that a vibration which creates a displacement $\Delta s$ between objective and specimen, also creates a displacement $\Delta i$ in the objective focal plane which is related to $\Delta s$ by the square of the magnification. Since the eyepiece focal plane must coincide with the objective focal plane for optimum viewing, and since the eyepiece must remain essentially stationary to accommodate its human operator, it follows that an anti-vibration design effort should concentrate on maintaining stability in the object conjugate. To that end I have arranged a microscope around an unusually heavy and stoutly constructed, rigid pillar which rises from a base. The microscope stage is mounted upon the pillar by means chosen to lend the stage a large measure of the pillar's rigidity. The stage has a relatively wide, vertical span of mounting bearings in contact with the pillar and the interface is relatively low on the pillar. The objective lens is also mounted in rigid relation to the pillar, by a strong cantilever arm rising at a low angle from the pillar and stoutly and rigidly held on the pillar. The eyepiece lens, or other viewing apparatus, is mounted on an arm, also cantilevered from the pillar, which extends over and around the objective mounting arm but which does not touch it anywhere. When the microscopist, or a bystander, touches the eyepiece mounting arm or the superstructure, vibrations and deflections which he might thereby introduce are to a large extent absorbed by the eyepiece mounting arm before they can be transmitted to the pillar or through it to the objective or stage mounts.

I have determined that by isolating the objective mount from the superstructure and holding the objective and stage together from the same rigid support, any microscope optical system will deliver a steadier, more vibration-free image. Nonetheless I have further discovered that vibration effects can be reduced even more by employing objective lenses which yield an infinite focus, i.e. by letting the objective collimate the rays which bear the image. The eyepiece employed with such an objective is telescopic in the sense that it forms and image from parallel incident rays, and accordingly its sensitivity to jumps in the image conjugate is greatly minimized.

DESCRIPTION OF THE PREFERRED EMBODIMENT

Figure 2:
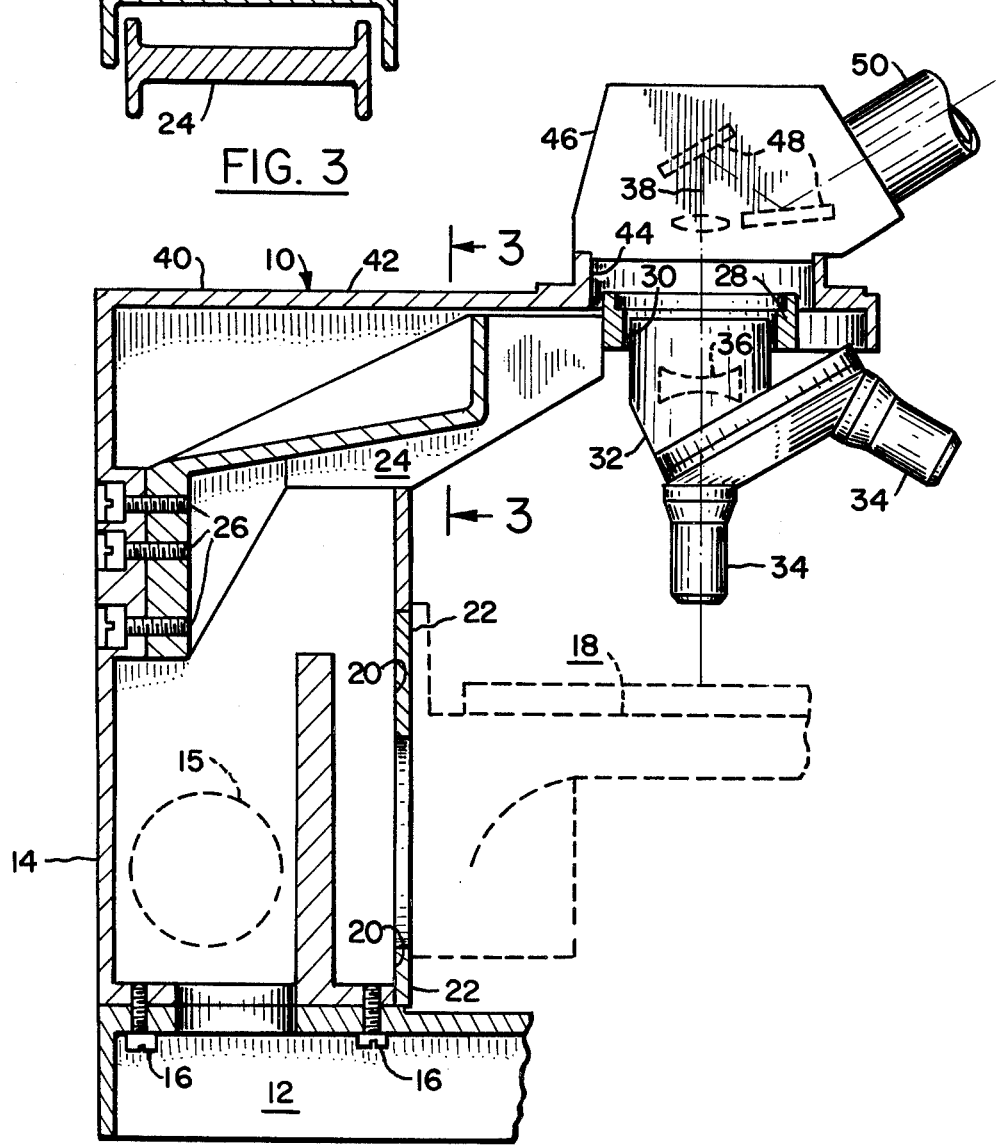
FIG. 2 is a sectional profile view of the microscope stand of my invention.

A microscope such as is discussed above is shown generally by the number 10 in FIG. 2. The microscope stand is mounted on a base 12 which is conventional in modern microscope design having adequate breadth and mass to give a stable footing to the microscope. Rising from the base is a pillar 14 which is constructed generally in the form of a hollow box to contain well-known focus adjustment mechanisms as indicated by the focusing knob 15. The pillar 14 must not be flimsy. Relatively thick material is employed for its walls in order to maximize its rigidity. It may be formed integrally with the base or it may be securely attached thereto, as shown, by means of the screws 16. As is more fully described in the copending patent application of Kenneth G. Bloomfield, Ser. No. 817,725 now U.S. Pat. No. 3,572,889, the stage 18 is demountably held on a low portion of the pillar 14 by means of two sets of interface bearings 20 and 22 whose bearing points are vertically separated by a wide margin in order to lend the stage the greatest measure of the pillar's rigidity and stability.

On the pillar 14 and generally above the stage 18 is mounted the objective lens mounting arm 24. It may be observed that the arm 24 is securely attached to the pillar 14 by means of the mounting screws 26 at a rearward position on the pillar 14 somewhat below its top. The outboard end 28 of the objective lens mounting arm 24 defines an aperture 30 in which the objective nosepiece 32 is held. A plurality of objective lens mounts 34 are rotatably held by well-known means in the nosepiece 32. The lenses in the various mounts 34 are optically cooperative with the fixed negative lens 36 to form an image of a specimen such as would have been placed on the stage 18, at infinity along the microscope axis 38.

Figure 1:
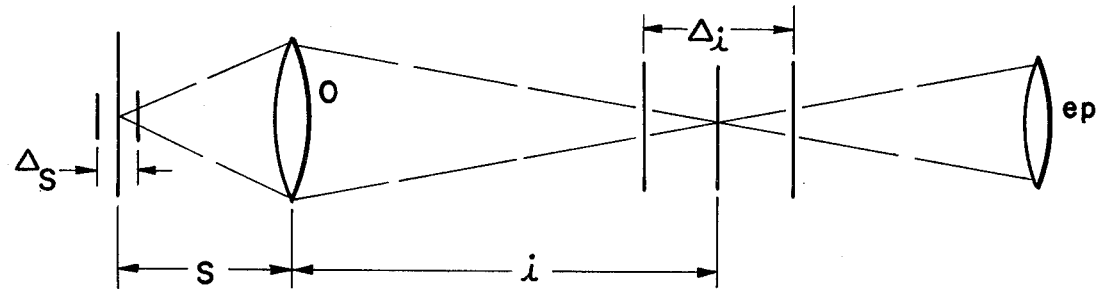
FIG. 1 is a diagram of the optical members in a typical microscope showing variations in the optical and image conjugates of a focusing objective lens.
Figure 3:
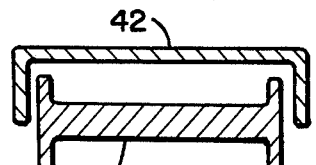
FIG. 3 is a sectional view along the lines 3—3 of FIG. 2.

The top 40 of the pillar 14 forms an arm 42 for mounting the eyepiece of the microscope and for supporting such other superstructure and microscope accessories as may be desirable. As best seen in FIG. 3, the objective lens mounting arm 24 fits inside the eyepiece mounting arm 42 and is entirely free of contact with the eyepiece arm or any of the accessories. It may be observed that a space is left by the objective mounting arm 24 and eyepiece mounting arm 42 so that small movements in the eyepiece mounting arm which may be induced by contact with the operator of the microscope or by movements which might occur in various accessories will not be transmitted to the objective mounting arm. At the end of the eyepiece mounting arm 42 is provided an aperture 44 into which may be set a variety of modules which are cooperative with the objective lens system described above. The apparatus shown comprises a relay assembly 46 having the mirrors 48 disposed to direct the microscope axis 38 to a suitable position for observation through the eyepieces 50.

It may be observed that the arm 24 slopes downward from its nosepiece mounting aperture and that, rather than mounting the arm 24 at a frontward portion of the pillar 14, the arm 24 is permitted a downward sweep to the rear portion of the pillar in order to make its mounting position very low on the pillar and away from the mounting position of the eyepiece mounting arm 42. Vibrations originating in the eyepiece or in accessories held by the eyepiece mounting arm must therefore be of such amplitude as to be imparted through a considerable expanse of the rigid pillar before they may be transmitted up through the objective mounting arm 24 to the objective itself. The objective arm 24 is formed in a vibration-resistant configuration, such as the I-beam construction which may be noted in FIG. 3.

The microscope stand of my invention can be used to special advantage in photomicrography. This field of microscopy is particularly sensitive to vibration since it is often necessary to hold a vibration-free condition for relatively long periods of time during exposures for which relatively low levels of light may be available.

I claim:

1. A microscope comprising:
   (a) a base;
   (b) a pillar arising from and rigidly attached to said base;
   (c) an optical system including an objective lens means and an image viewing means;
   (d) a first cantilever support arm having first and second ends, said first end rigidly attached to said pillar, said second end supporting said image viewing means;
   (e) a second cantilever support arm having first and second ends, said first end immovably attached to said pillar intermediate said base and said first arm, said second end supporting said objective lens means and positioning said objective lens means in alignment with said image viewing means, said second arm being free of contact from said first arm;
   (f) a stage attached to said pillar intermediate said base and said second arm, said stage being movable relative to said second arm and said objective lens means for focusing said microscope.

2. The microscope as set forth in claim 1 wherein said objective lens means includes lenses which produce an image at infinity and said image viewing means includes telescopic viewing optics.

3. The microscope as set forth in claim 1 wherein said support pillar is hollow and includes front and rear surfaces and wherein said first end of said second arm is immovably attached to said rear surface of said support pillar.

4. The microscope as set forth in claim 1 wherein said objective lens means includes a plurality of lenses mounted on a turrent for selective alignment with said image viewing means.

* * * * *